June 21, 1932.   H. FELDMEIER ET AL   1,863,786
PROCESS AND APPARATUS FOR HEATING LIQUIDS
Filed Oct. 30, 1929
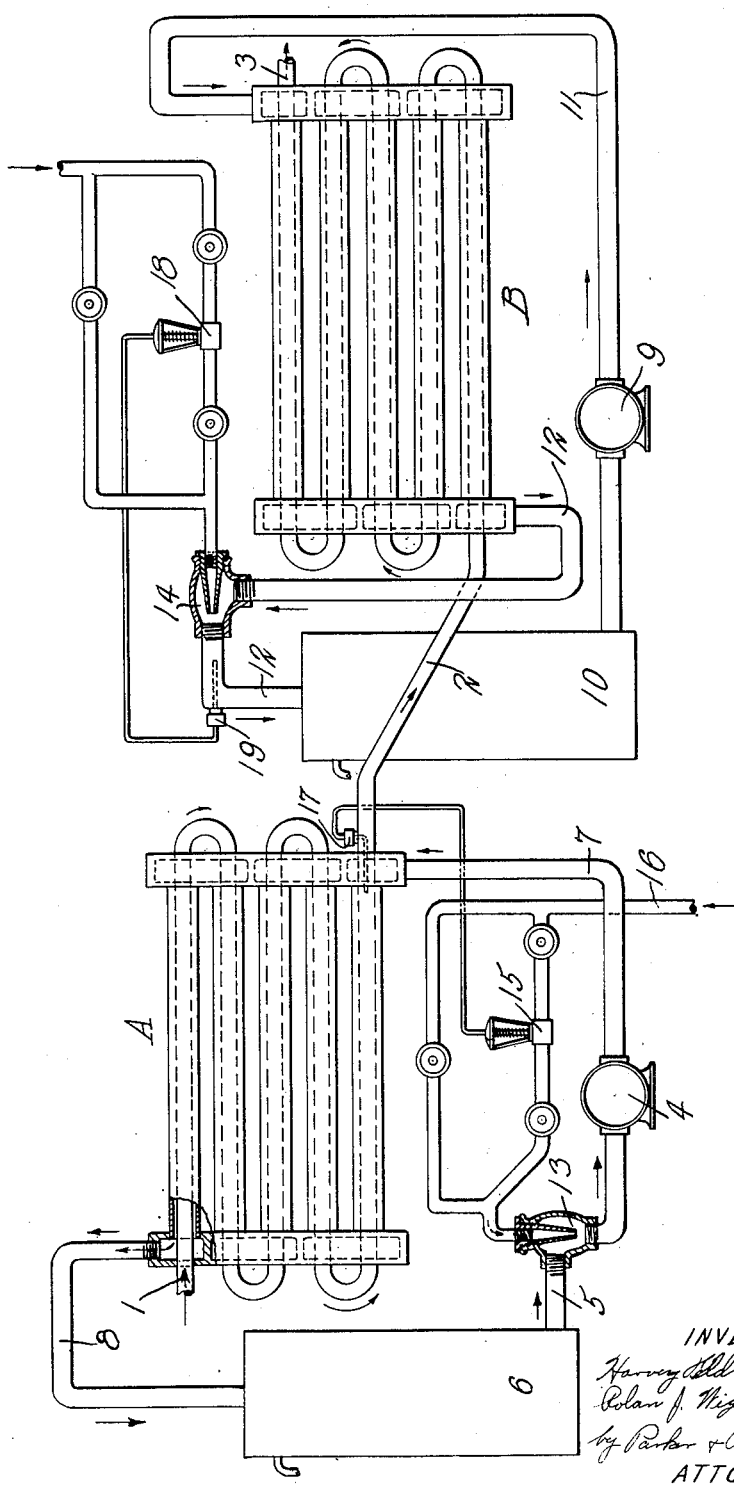
INVENTOR.
Harvey Feldmeier, and
Rolan J. Wightman
by Parker & Prochnow
ATTORNEYS.

Patented June 21, 1932

1,863,786

UNITED STATES PATENT OFFICE

HARVEY FELDMEIER AND ROLAN JAY WIGHTMAN, OF LITTLE FALLS, NEW YORK, ASSIGNORS TO CHERRY-BURRELL CORPORATION, OF LITTLE FALLS, NEW YORK

PROCESS AND APPARATUS FOR HEATING LIQUIDS

Application filed October 30, 1929. Serial No. 403,449.

This invention relates to a process and apparatus for heating liquids, such as milk, the process and apparatus being especially desirable for heating milk for pasteurizing the same.

In the pasteurization of milk by the methods ordinarily practiced, the milk is supposed to be heated to a specified legal temperature and there held for the length of time necessary for pasteurization, the holding time varying with different temperatures and being shorter with higher temperatures. Most cities and States specify a particular temperature as legal for the pasteurization of milk. For instance, some specify 143° F. and others 145° F. as the legal temperature. A pasteurizing temperature of 143° F. gives a leeway of about one to two degrees between that temperature and the temperature of 145° or more exactly 144½° where the cream line of the milk begins to be impaired. A specified pasteurization temperature of 145° or higher therefore makes it extremely difficult to comply with the law and not injure the cream line. It is very important to heat the milk fully up to the specified legal temperature, whatever that may be, and not allow it to drop below that temperature, but it is also important, in order to prevent injury to the cream line, not to overheat the milk or permit it to remain above that temperature where injury to the cream line begins.

Much difficulty has been experienced, and great care required in the pasteurizing process and apparatus heretofore used to attain these results, that is to heat the milk accurately up to the required temperature and not let it drop below that temperature, and yet not overheat the milk.

One object of our invention is to provide a process and apparatus by which a liquid can be heated in continuous flow to a uniform predetermined temperature, so that variations in the temperature will not exceed predetermined limits, about one degree apart.

Another object of our invention is to provide a process and apparatus by which a liquid can be heated accurately to a predetermined required temperature without exceeding such temperature or overheating the liquid.

Other objects of the invention are to provide a heating process and apparatus in which liquids, such as milk, can be uniformly heated accurately to a predetermined required temperature with the minimum supervision and care; in which a liquid in continuous flow is heated accurately to a predetermined temperature in successive stages by heat transfer from a fluid heating medium, and in which the maximum temperature of the heating medium used in the final stage is not substantially greater than the required final temperature of the liquid, so as thereby to positively prevent the overheating of the liquid; also to provide a process and apparatus in which the liquid is heated in successive stages, and in which the temperatures in the different stages are separately controlled, the temperature to which the liquid is heated in the final stage being controlled by regulating the temperature of the heating medium; and in which the liquid is heated in successive stages and the temperature of the heating medium used in a preliminary stage is regulated so that the liquid will leave this stage substantially at a predetermined temperature notwithstanding that the cold liquid may enter this stage at one or another temperature, and in which the temperature of the heating medium used in the final stage is regulated so as not to substantially exceed the final required temperature of the liquid.

A further object of the invention is to improve liquid heating processes and apparatus in the other respects hereinafter described and set forth in the claims.

The accompanying dawing is a diagrammatic illustration of a multiple stage liquid heating apparatus embodying the invention and adapted for performing the process.

Referring to said drawing A and B represent respectively peliminary and final stage heaters, hereinafter, for convenience, termed respectively the first and second heaters. These heaters may be of any suitable construction, such for instance, as the usual internal tube liquid heater in which the liquid to be heated (hereinafter, for clearness, referred to as milk) flows or circulates through a bank of tubes which are connected to form a continuous passage for the milk, and which are surrounded by outer tubes connected to form a continuous passage for the flow or circulation of a heating medium, such as hot water, so that the milk in the inner tubes is heated by exchange of heat from the heating medium to the milk. In practice, each of the heaters A and B is constructed so as to give a large area of heat exchange surface and so that the volume of the heating medium used in the heater may be several times that of the milk, thus insuring the heating of the milk to the required temperature in each stage without necessitating a very great difference in temperature between the milk and the heating medium. Also in practice it is preferable for the heaters to be arranged and connected so that the milk and the heating medium flow in countercurrent directions, whereby the heating medium enters the heater adjacent the point of discharge of the milk and leaves the heater adjacent the point of entrance of the milk. The milk partially heated in the first heater flows directly therefrom through the second heater.

1 represents the milk supply pipe for the cold or raw milk leading to the inlet of the first heater A, 2 represents a pipe connecting the discharge of this heater with the inlet of the second heater B, and 3 represents a discharge pipe through which the heated milk leaves the second heater B. The heating medium or water may be circulated through the first heater A by a pump 4 which draws the water by a pipe 5 from a tank 6 and delivers the water by a pipe 7 to the heater A, forcing the water to circulate through the heater A around the milk passage thereof and return from the heater to the supply tank 6 by a pipe 8.

The milk may be similarly heated in the second heater B by water circulated by a pump 9 which takes the water from a tank 10 and delivers the same by a pipe 11 to the inlet end of the heater B, the water after passing through the heater B and heating the milk therein, being returned by a pipe 12 to the tank 10. Preferably the water or heating medium for each heating stage is separately heated by suitable means, such as the usual steam heating jet, such a steam heating jet being indicated at 13 in the water circulating system of the first stage A, and a second similar steam heating jet being indicated at 14 in the water circulating system of the second stage B.

15 represents a temperature controller for the first stage heater A. This temperature controller may be a valve adapted to regulate the supply of steam from the steam line 16 to the heating jet 13 under the control of a thermostat 17 which is preferably arranged in the milk outlet of the first heater A, or is otherwise arranged so as to be influenced by the temperature of the heated milk leaving the first heater. Since this thermostat controls in response to the temperature of the heated milk leaving the first heating stage, it is adapted to actuate the temperature controller so as to admit more or less steam, as may be necessary, depending upon the temperatures at which the raw milk enters the first stage, which may be different at different times for the following reason.

It is usual in milk pasteurizing apparatus for the raw milk to pass through a regenerator in which hot milk coming from a milk holder partially heats the raw milk before the latter enters the steam heated heater, but the regenerator does not operate at the commencement of the pasteurizing operation until after the holder in which the heated milk is held at the pasteurizing temperature is filled. Therefore, when starting the apparatus, before the holder is filled, which may be thirty minutes, the raw milk may enter the heater at the storage temperature of about 40° F., whereas after the holder is full, the raw milk is heated by the regenerator, and may enter the heater A at a temperature of approximately 120° F. By operating the temperature controller 15 under the control of the thermostat 17 responsive to the temperature of the heated milk leaving the heater A, the milk leaves the heater at substantially uniform temperature, regardless of the entering temperature of the milk.

The temperature to which the milk is heated in the second heater B may be controlled by a temperature controller 18 arranged to regulate the supply of steam to the heating jet 14, but this temperature controller 18 is preferably actuated under the control of a thermostat 19 which is located in the pipe 12 for the water or heating medium for the second heater B, between the heating jet 14 and the tank 10, or is otherwise arranged so as to respond to the temperature of the heating medium delivered to the second heater B. By this arrangement the temperature controller 18 operates to maintain a predetermined maximum temperature of the heating medium entering the final heater.

In the operation of the apparatus in pasteurizing milk, according to my improved process, the temperature controller for the first stage heater A is set to regulate the temperature of the heating medium supplied to this heater, so that the heated milk leaves this heater at a temperature of approximately 138° F. whereas the temperature of the heating medium supplied to the second or final stage heater B is maintained approximately at the final milk temperature, or not more than about one degree higher than the final temperature to which the milk is heated in the final stage heater B.

The area of the heat interchange surface in each heater is made amply large and a sufficient volume of heating medium is circulated through the heater to impart the required temperature to the milk being heated in that heater. For instance, in the first stage heater A the volume of the water circulated is preferably about three times that of the milk flow. This means that the water enters this heater at about 142° F. when the entering temperature of the raw milk is 40° more or less, or the water may enter at about 140° F. when the entering milk temperature is 120° F. more or less. The second stage heater receives the milk from the first stage at a temperature of about 138° F. and heats it to the final pasteurizing temperature. If this is 143° or 145°, it is necessary to raise the temperature of the milk only about five to seven degrees.

The water flow through the second stage heater in such case is preferably about four to five times that of the milk flow. This combination of a small rise in the milk temperature with a large heat exchange surface and a large flow of water in proportion to the rise in milk temperature, brings the water and milk temperatures so close together that it makes practical a very close, accurate control of the final milk temperature. In practice, this control is within one degree, which means a variation of one-half of a degree each way, and the incoming water temperature is maintained about one degree only above the final milk temperature. By placing the temperature controlling thermostat for the final stage in the water circulating line so as to be affected by the return water just before it reaches the tank, as explained, a uniform temperature of the water in the tank and through the circulating pump into the final stage heater is ensured.

It has been discovered that thermophiles thrive and rapidly increase in numbers in the milk during pasteurization when such pasteurizing temperatures as above mentioned are used. There is therefore a possibility, and even a probability, that in order to avoid trouble from thermophiles, and for other reasons, a higher temperature and shorter period of time may be adopted for pasteurization. At present, one system, which is recognized to some extent, uses about 165° F. for about ten seconds. With short time pasteurization of this sort, uniform temperature control will be all the more necessary. The hereinbefore described process and apparatus are also suited to such short time pasteurization.

We claim as our invention:

1. The process of heating a liquid to a predetermined required temperature and preventing the overheating thereof, which comprises heating the liquid in successive stages, the liquid being heated in a preliminary stage by circulating a heated medium in heat exchange relation to said liquid, regulating the temperature of the heated medium used in the preliminary stage under the control of the temperature of the liquid being heated so that the liquid will leave the preliminary stage at a temperature lower than the final required temperature, and controlling the temperature to which the liquid is heated in the final stage under the control of the temperature of said heated medium entering said final stage.

2. The process of heating a liquid accurately to a predetermined required temperature, which comprises separately heating the liquid in successive stages, causing the liquid to leave a preliminary heating stage and enter the final heating stage at a temperature a few degrees only below said required final temperature, the liquid being heated in the final stage by flowing it in heat exchange relation with a flowing heating medium, the volume of flow of which is several times that of the liquid, and the entering temperature of which is maintained substantially constant and not substantially greater than the final required temperature of the liquid by supplying heat to said heating medium under the control of the temperature at which said heating medium enters said final stage.

3. The process of heating a liquid accurately to a predetermined required temperature, which comprises separately heating the liquid in successive stages, causing the liquid to leave a preliminary heating stage and enter the final heating stage at a temperature a few degrees only below said required final temperature, the liquid being heated in the final stage by flowing it in heat exchange relation with a flowing heating medium, the volume of flow of which is several times that of the liquid, and maintaining the heating medium entering the final stage at a substantially constant temperature not more than about one degree higher than the final required temperature of the liquid, by regulating the temperature of said heating medium under the control of the temperature at which said heating medium enters said final stage.

4. The process of heating milk accurately to a predetermined pasteurizing temperature, which comprises separately heating the milk in successive stages, causing the milk to leave a preliminary heating stage and enter the final heating stage at a temperature of about 138° F. by regulating the heating of the milk in said preliminary stage under the control of the temperature of the milk leaving said preliminary stage, the milk being heated in the final stage by bringing it into heat exchange relation with a flowing heating medium of sufficient volume to raise the temperature of the milk to the required final temperature of about 143° or 145° F., with the entering temperature of the heating medium not exceeding about one degree above said final temperature of the milk.

5. The process of heating milk accurately to a predetermined pasteurizing temperature, which comprises separately heating the milk in successive stages by bringing the milk in each heating stage into heat exchange relation to a flowing heating medium, the temperature of the heating medium entering a preliminary stage being so regulated under the control of the temperature of the milk leaving that stage and the volume of flow of the heating medium and the area of the heat exchange surface in said preliminary stage being such that the milk leaves said stage and enters the final stage below said pasteurizing temperature, and the maximum temperature of the heating medium for the final stages being approximately equal to said predetermined pasteurizing temperature, and the volume of flow of the heating medium and the area of heat exchange surface in the final heating stage being such as to raise the temperature of the milk from its entering temperature to said predetermined pasteurizing temperature.

6. A multiple stage liquid heating apparatus comprising a preliminary and a final heater through which the liquid passes in succession, means for circulating a separate heating medium through each heater in heat exchange relation with the liquid therein, temperature regulating means which are controlled by the temperature of the liquid leaving the preliminary heater and which regulate the temperature of the heating medium entering the preliminary heater to maintain the liquid leaving said heater at a temperature below the final required temperature of the liquid, and temperature regulating means which are controlled by the temperature of the heating medium entering the final heater and which operate to maintain the heating medium entering the final heater at a temperature not substantially exceeding the final required temperature of the liquid.

7. The process of heating milk uniformly to a predetermined required temperature, which comprises heating the milk in successive stages, the milk being heated in a preliminary stage by circulating a heated liquid in heat exchange relation to the milk, regulating the temperature of the heated liquid used in said preliminary stage under the control of the temperature of the milk leaving said preliminary stage so as to cause the milk to leave said preliminary stage at a temperature lower than the final required temperature, and regulating under control of the temperature of the heated liquid supplied to the final stage the temperature to which the milk is heated in said final stage.

8. A multiple stage liquid heating apparatus comprising a preliminary and a final heater through which the liquid passes in succession, means for circulating a separate heating medium through each heater in heat exchange relation with the liquid therein, temperature regulating means for the preliminary heater which is controlled by the temperature of the liquid leaving said preliminary heater and causes the liquid to leave the preliminary heater at a temperature below the final required temperature of the liquid, and temperature regulating means for the final heater which operates to prevent the maximum temperature of the heating medium entering the final heater from substantially exceeding the final required temperature of the heated liquid.

HARVEY FELDMEIER.
ROLAN JAY WIGHTMAN.